United States Patent [19]

Resch et al.

[11] Patent Number: 4,467,141

[45] Date of Patent: Aug. 21, 1984

[54] TELECOMMUNICATION SYSTEM WITH RADIO LINE

[75] Inventors: Heinz Resch, Vienna; Franz Machl, Perchtoldsdorf; Klaus Kerschbaumer, Vienna; Helmut Ullrich, Ebenfurth, all of Austria

[73] Assignee: Portaphone AG, Pfäffikon, Switzerland

[21] Appl. No.: 415,445

[22] Filed: Sep. 7, 1982

[30] Foreign Application Priority Data

Sep. 8, 1981 [AT] Austria ................................. 3879/81

[51] Int. Cl.³ .......................................... H04M 11/00
[52] U.S. Cl. ............................................... 179/2 EA
[58] Field of Search ................. 179/2 E, 2 EA, 2 EB; 455/32-38, 76, 77, 183

[56] References Cited

U.S. PATENT DOCUMENTS

| | | | |
|---|---|---|---|
| 3,458,664 | 7/1969 | Adlhoch et al. | 179/2 EB |
| 3,476,882 | 11/1969 | Vogelman et al. | 179/2 E |
| 3,588,371 | 6/1971 | Dal Monte | 179/2 EB |
| 3,806,663 | 4/1974 | Peek et al. | 179/2 EB |
| 4,012,597 | 3/1977 | Lynk, Jr. et al. | 179/2 E |
| 4,332,981 | 6/1982 | Palombi et al. | 179/2 EA |

*Primary Examiner*—A. D. Pellinen
*Assistant Examiner*—W. J. Brady

*Attorney, Agent, or Firm*—Karl F. Ross; Herbert Dubno

[57] ABSTRACT

A mobile subscriber station served by a telephone network is coupled by a radio link with an individually associated stationary relay station directly connected to that network. The tow stations are able to communicate with each other, over a radius of about 50 meters, on any of 40 channels available to all the posts of subscriber and relay stations in the neighborhood. Each station of a post includes a transmitter and a receiver operating at about 900 MHz; in the idle state of the post, the receivers of both stations continuously scan the available channels to determine their free or busy condition. A person wishing to make an outgoing call causes the transmitter of the subscriber station to send out a predetermined code word which is picked up by the receiver of the associated relay station in its scanning operation and, upon verification by a code comparator, initiates the emission of a handshake signal to the subscriber station whereupon the channel is seized to let the call proceed over the network. Similarly, the arrival of an incoming call at the relay station results in the transmission of the same or another predetermined code word to the subscriber station on a free channel which is seized for reception of the call after the code has been verified. With the code or codes used for outgoing and incoming calls uniquely assigned to a particular team, privacy is assured.

4 Claims, 2 Drawing Figures

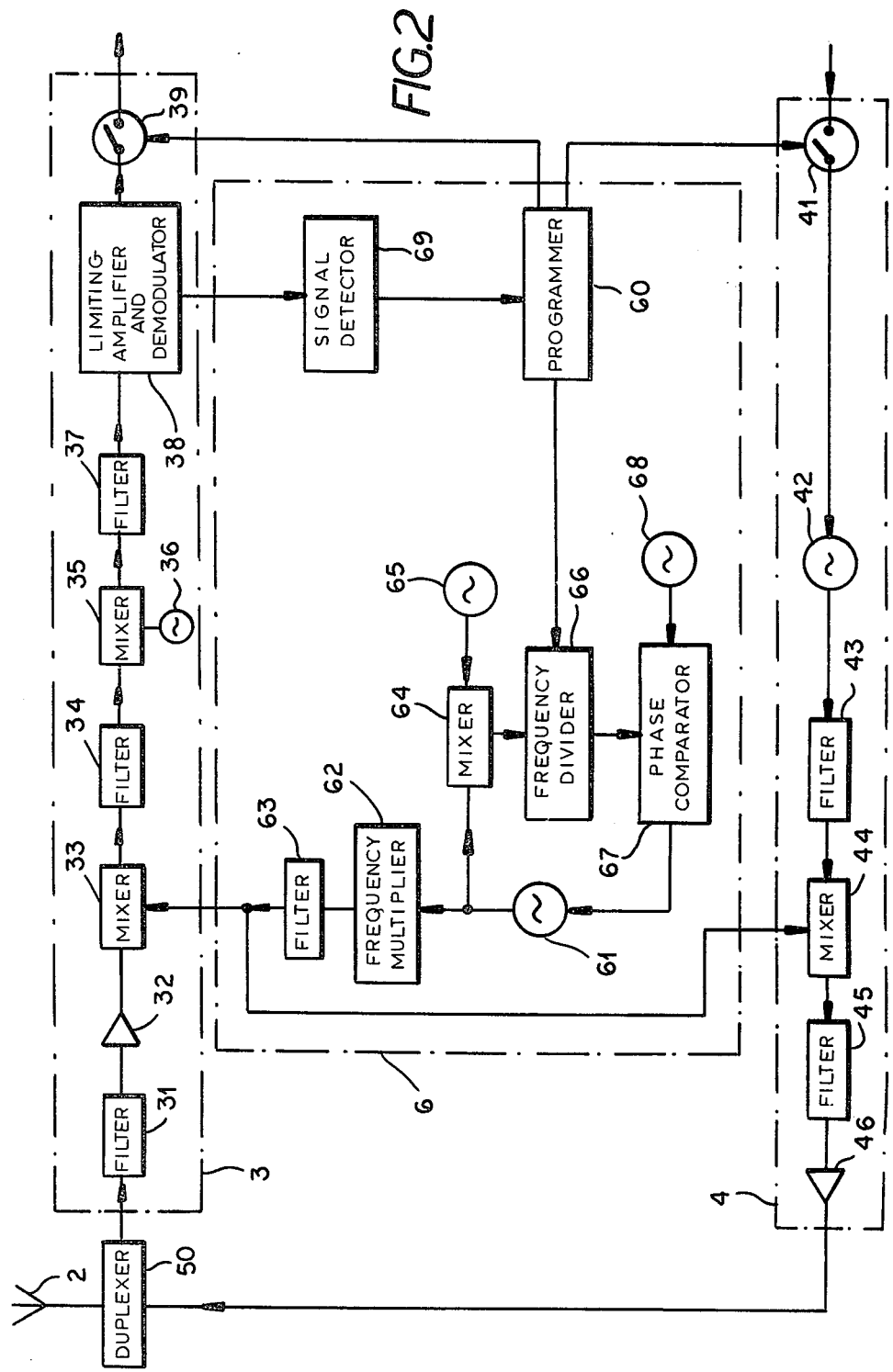

TELECOMMUNICATION SYSTEM WITH RADIO LINE

FIELD OF THE INVENTION

Our present invention relates to a telephone or other telecommunication system wherein a multiplicity of subscribers are served by one or more central offices through a wired network terminating at fixed relay stations which communicate by radio lines with associated subscriber stations.

BACKGROUND OF THE INVENTION

In such a system the subscriber stations will be movable relatively to their relay stations within a range whose radius is determined by the power of the transmitters at each end of the respective links. In order to insure the necessary privacy, each subscriber station conventionally operates on a radio frequency individually assigned thereto. In practice, an operating range with a radius of about 50 meters will allow telephone calls to be received and transmitted anywhere in a subscriber's house. With only a limited number of radio frequencies available, the same frequency will have to be allocated to stations spaced sufficiently far apart to prevent possible cross-talk or listening-in; in rural areas, for example, 40 communication channels may suffice to cover a region of about 3 km in radius. In multidwelling urban housing, however, such a channel allocation would be inadequate.

OBJECT OF THE INVENTION

The object of our present invention is to provide a telecommunication—especially telephone—system in which the problem of channel allocation to radio links between mobile subscriber stations and fixed relay stations in densely populated areas is solved.

SUMMARY OF THE INVENTION

In a system according to the present invention, each relay station connected to a branch of a wired network is uniquely identified by an individual call number assigned to an associated subscriber station coupled therewith through a radio link, the combination of a relay station and a subscriber station being referred to hereinafter as a post; it should be understood, however, that the subscriber station of any post may encompass several extensions reached for example through a common switchboard. The subscriber station of each post comprises a first radio transmitter and a first radio receiver which are tunable to any one of a plurality of communication channels available to a group of such posts, the first radio receiver being provided with first scanning means for cyclically exploring these channels in an idle state of the subscriber station to determine their free or busy condition. The subscriber station further comprises first coding means and first comparison means, the latter being connected to the first radio receiver and to the first coding means for detecting an identity between a locally generated reference code and a code received on any of the channels in order to cause the first radio transmitter to send out a first verification signal on the same channel upon detection of such identity. The subscriber station additionally includes a selector means for initiating an outgoing call by triggering the first radio transmitter to send out a locally generated identification code, on a channel found idle by the first radio receiver, preparatorily to the emission of a call signal to the wired network in response to reception of a second verification signal on the channel found idle. In an analogous manner, the associated relay station comprises a second radio transmitter and a second radio receiver tunable to the same channel, the second radio receiver being provided with second scanning means for cyclically exploring these channels in an idle state of the relay station to determine their free or busy condition. The relay station further comprises second coding means and second comparison means, the latter being connected to the second radio receiver and to the second coding means for detecting an identity between a locally generated reference code and a code received on one of the channels and for causing the second radio transmitter to send out the aforementioned second verification signal upon detection of such identity, the second radio transmitter being triggerable by an incoming call signal from the network to send out a locally generated identification code on a channel found idle by the second radio receiver preparatorily to seizing the idle channel in response to reception of the aforementioned first verification signal over that channel for enabling an extension of the incoming call to the associated subscriber station.

In the field of use more specifically contemplated, and as particularly described hereinafter, the selector means of the subscriber station will be part of a telephone set.

Such a system will not only insure the necessary privacy but also prevent a subscriber from channeling an outgoing call through a relay station of an adjacent post whose subscriber would then be falsely charged for that call.

The reference code generated by the first coding means matches the identification code generated by the second coding means but need not be identical with the identification code generated by the first coding means or the reference code generated by the second coding means. A diversity of the two reference codes used by the two stations of a post will in fact provide additional safeguards against invasion of privacy or unauthorized channeling of outgoing calls through unrelated relay station.

In telephone systems with mobile stations on automotive vehicles it is known to use address codes for discriminating among different satellite stations aboard vehicles within range of a central relay station. In such a system, however, the address codes are the equivalent of call numbers individually assigned to the various mobile satellite stations. This contrasts with our present system in which a code (e.g. a 15-bit word) is used strictly for verification since no relay station can communicate with any subscriber station other than the one forming part of the same post.

BRIEF DESCRIPTION OF THE DRAWING

The above and other features of our invention will now be described in detail with reference to the accompanying drawing in which:

FIG. 2 shows detail of certain components of a subscriber station forming part of the post of FIG. 1.

SPECIFIC DESCRIPTION

Figure 1:
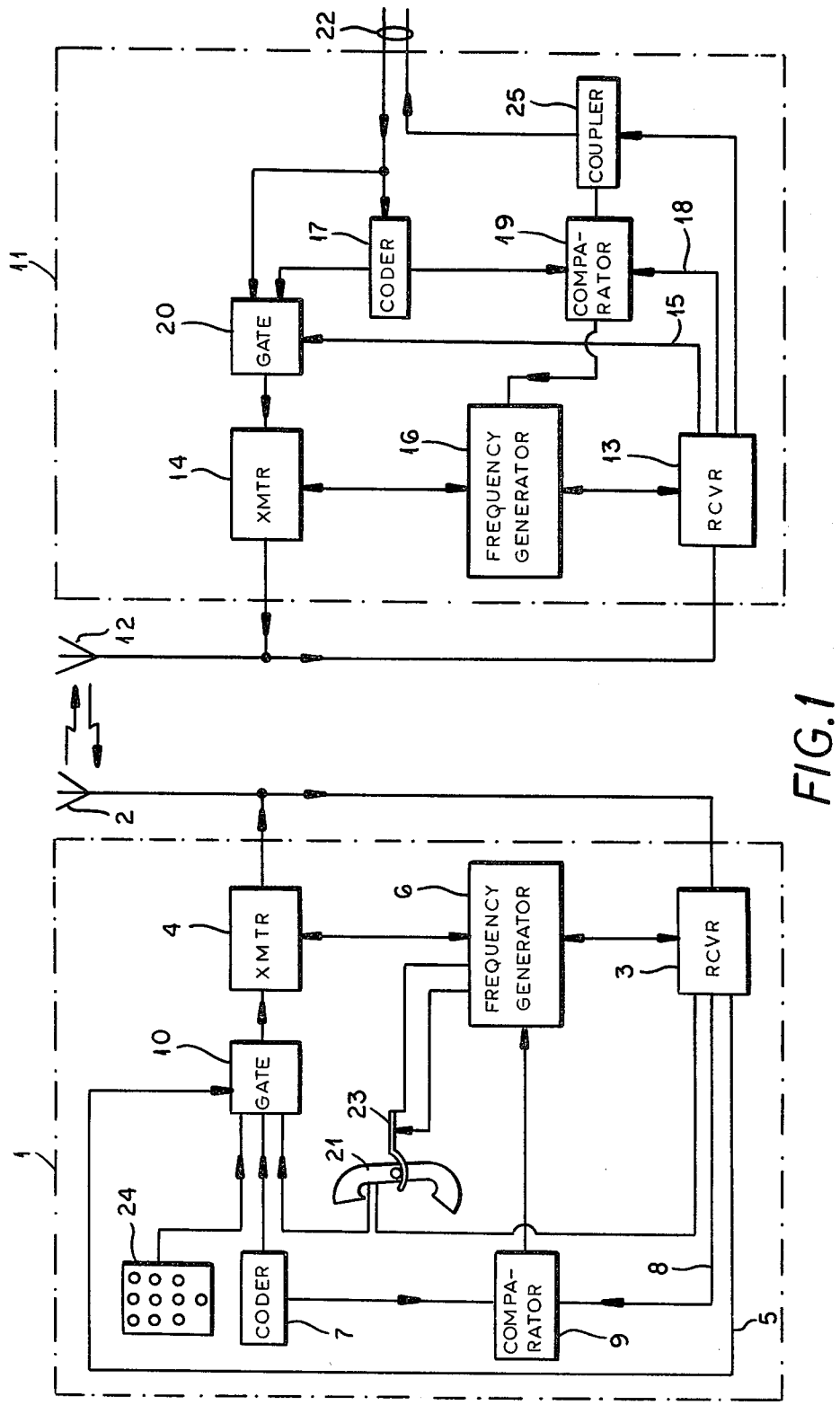
FIG. 1 shows a post adapted to communicate through a branch of a wired telephone network with a central office.

The post shown in FIG. 1 comprises a mobile subscriber station 1 and a fixed relay station 11 communicating with each other through a radio link formed by respective antennas 2 and 12. Subscriber station 1 includes a receiver 3 which, under the control of a frequency generator 6, cyclically scans (in an idle state of the station) a multiplicity of radio-frequency channels allocated to a group of such posts; frequency generator 6 also controls a transmitter 4. Receiver 3 has two output leads 5 and 8, the latter serving to deliver a 15-bit code word encountered on any channel during the scanning thereof. Such a code word may appear, upon demodulation, in a low-frequency band reserved for voice transmission and separated from a narrow frequency band of the same channel on which a pilot signal appears when the channel is busy. When a channel is found to be idle and carries no code word, receiver 3 energizes its output 5 to unblock a gate 10 for enabling the initiation of an outgoing call by a subscriber with the aid of a keyboard 24; the selection signals from the keyboard then reach the transmitter 4.

A code word appearing on lead 8 is fed to a comparator 9 which receives a locally generated reference code from a coder 7 connected thereto. Coder 7 also delivers a 15-bit identification code, which may be different from the aforementioned reference code, to transmitter 4 whenever that transmitter is triggered to seize an idle channel upon a lifting of a handset 21 by the subscriber wishing to initiate an outgoing call. The transmitter 4 then sends out the locally generated identification code by way of the radio link, using the heretofore idle channel, to relay station 11 where that code arrives at a receiver 13 which also cyclically scans the available communication channels under the control of a frequency generator 15. Receiver 13 has two output leads 15 and 18, similar to leads 5 and 8 of receiver 3, the first of which serves to unblock a gate 20 upon detection of an idle channel while the second one delivers an incoming identification code to a comparator 19 also receiving from a coder 17 a locally generated reference code. A transmitter 14 in relay station 11, also controlled by frequency generator 16, receives from coder 17 a locally generated 15-bit identification code, identical with the reference code emitted by coder 7 of subscriber station 1, for emission via the radio link whenever an incoming call addressed to post 1, 11 arrives over a line 22 by which station 11 is connected to the otherwise nonillustrated telephone network. The use of 15-bit words enables discrimination among more than 30,000 posts to which the same set of, say, 40 communication channels is available. Naturally, each receiver 3, 13 remains connected long enough to any channel found to be idle, i.e. one that lacks the pilot signal indicating its busy condition, to receive the entire 15-bit code word recurrently sent out by transmitter 14 or 4 upon the arrival of an incoming call or the initiation of an outgoing call, respectively.

When comparator 9 detects an identity between an identification code received from station 11 and the locally generated reference code, it enables—via handset 21 and an associated hook switch 23 in the illustrated embodiment—the transmitter 4 to sent out the identification code generated by coder 7 which in turn is relayed by receiver 13 via terminal 18 to comparator 19, the latter thereupon checking its identity with the reference code generated by coder 17. When that check has a positive outcome, transmitter 14 is enabled to send a "handshake" signal to receiver 3 and to extend an incoming call waiting on line 22 to subscriber station 1 which in turn can now transmit messages to relay station 11 for establishment of full-duplex communication via a coupler 25 between line 22 and station 1.

Comparator 19, similarly, enables the transmitter 14 (through the intermediary of line 22 and the central office connected thereto) to send the locally generated identification code to subscriber station 1 whose receiver 3 feeds it to comparator 9 for checking against the reference code generated by coder 7. When identity is found to exist, a "handshake" signal is sent to relay station 11; the subscriber then receives dial tone and can now proceed to select the call number of the remote station by means of keyboard 24.

In FIG. 2, we have shown, by way of example, a possible embodiment of receiver 3, transmitter 4 and frequency generator 6 also representative of their counterparts 13, 14 and 16. A duplexer 50 directs incoming high-frequency signals to a band-pass filter 31 of receiver 3 whence they are fed by an amplifier 32 to a first mixing stage 33 for heterodyning with an output signal of frequency generator 6. The resulting intermediate-frequency signal, which preferably lies in a range well below 100 MHz, passes through a filter 34 to a second mixing stage 35 for further step-down to a substantially lower frequency range with the aid of a heterodyning frequency from a local oscillator 36. The stepped-down signal is fed through a further filter 37 to a limiting amplifier and demodulator 38 connectable by a switch 39 to the earpiece of handset 21 (FIG. 2). (In the relay station 11 of FIG. 1 the corresponding receiver output would be extended via coupler 25 to line 22.) The part of the receiver working into leads 5 and 8 of FIG. 1 has not been illustrated in FIG. 2.

Frequency generator 6 is shown to comprise a voltage-controlled oscillator 61 included in a phase-locking loop which comprises a mixer 64 also receiving a heterodyning frequency from a crystal-controlled oscillator 65 to produce a difference frequency, preferably on the order of 1 MHz, which is stepped down by an adjustable frequency divider 66 under the control of a sequencer forming part of a programmer 60. The divided difference frequency is fed, together with a reference frequency from a crystal-controlled oscillator 68, to a phase comparator 67 emitting a corrective voltage to oscillator 61 for establishing an operating frequency thereof dependent on the momentary step-down factor of divider 66. This operating frequency is stepped up by a frequency multiplier 62, followed by a band-pass filter 63, to a level sufficiently close to an incoming carrier frequency to give rise to the first intermediate-frequency signal upon being applied to mixer 33; the output of filter 63 is also connected to an input of a mixer 44 in transmitter 4 working through a filter 45 and an amplifier 46 into duplexer 50. A switch 41 in transmitter 4, when closed, connects the microphone of handset 21 to a modulating input of a voltage-controlled oscillator 42 which, through a filter 43, feeds the mixer 44 with a frequency that, when added to the output frequency of filter 63, produces an outgoing carrier differing by, say, 45 MHz from the incoming carrier if both carriers are of a magnitude on the order of 900 MHz.

A signal detector 69 in frequency generator 6 has an input connected to amplifier/demodulator 38 to monitor the activity of any channel to which receiver 3 is tuned by the momentary operating frequency of oscillator 61. Detector 69 controls the programmer 60 to seize an incoming channel, along with an associated outgoing channel, in response to a signal/noise ratio on such incoming channel exceeding a predetermined threshold; the detector operates with a certain hysteresis to prevent a release of the seized channels upon a temporary drop of the S/N ratio below that threshold. A seizure command from detector 69 causes the programmer 60 to arrest its sequencer and to close the switches 39 and 41. (In the relay station 21 of FIG. 1, the counterpart of switch 41 connects the subscriber line 22 via gate 20 to the modulating input of oscillator 42.) Programmer 60 also causes the emission of the pilot signal upon seizure of a channel.

In a specific instance, receiver 3 may be tunable to carrier frequencies between 906,987.5 and 906,012.5 KHz accommodating 40 incoming channels spaced 25 KHz apart; 40 outgoing channels respectively paired therewith, separated therefrom by 45 MHz, correspond to carrier frequencies in a range of 951,987.5 to 951,012.5 MHz. The mean operating frequency of VCO 61 may be 70 MHz, for example. Filter 37 may be of the narrow-band type centered on, say, 21.4 MHz. The assembly of FIG. 2 may be realized by integrated circuitry.

The apparatus according to our invention can also be used to send and receive data by frequency-shift keying.

We claim:

1. A telecommunication system comprising a wired network and a multiplicity of posts served by said network for selectively communicating with one another, each of said posts being uniquely identified by an individual call number and comprising a relay station connected to a branch of said network and a mobile subscriber station coupled with said relay station by a radio link of limited range;

said subscriber station comprising a first radio transmitter and a first radio receiver tunable to any one of a plurality of communication channels available to a group of said posts, said first radio receiver being provided with first scanning means for cyclically exploring said channels in an idle state of the subscriber station to determine their free or busy condition, said subscriber station further comprising first coding means and first comparison means connected to said first radio receiver and to said first coding means for detecting an identity between a locally generated reference code and a code received on one of said channels and for causing said first radio transmitter to send out a first verification signal on the same channel upon detection of such identity, said subscriber station additionally including selector means for initiating an outgoing call by triggering said first radio transmitter to send out a locally generated identification code on a channel found idle by said first radio receiver preparatorily to the emission of a call signal to said network in response to reception of a second verification signal on the channel found idle, said relay station comprising a second radio transmitter and a second radio receiver tunable to said channels, said second radio receiver being provided with second scanning means for cyclically exploring said channels in an idle state of the relay station to determine their free or busy condition, said relay station further comprising second coding means and second comparison means connected to said second radio receiver and to said second coding means for detecting an identity between a locally generated reference code and a code received on one of said channels and for causing said second radio transmitter to send out said second verification signal upon detection of such identity, said second radio transmitter being triggerable by an incoming call signal from said network to send out a locally generated identification code on a channel found idle by said second radio receiver preparatorily to seizing the idle channel in response to reception of said first verification signal thereover for enabling an extension of the incoming call to said subscriber station.

2. A telecommunication system as defined in claim 1 wherein said selector means is part of a telephone set.

3. A telecommunication system as defined in claim 1 or 2 wherein the reference code generated by said first coding means matches the identification code generated by said second coding means but is different from the identification code generated by said first coding means, the latter matching the reference code generated by said second coding means.

4. A telecommunication system as defined in claim 1 or 2 wherein each of said radio receiver comprises a crystal-controlled oscillator, a voltage-controlled oscillator slaved in a phase-locking loop to said crystal-controlled oscillator, and frequency-dividing means connected to an output of said voltage-controlled oscillator, each of said scanning means comprising a sequencer connected to a control input of the respective frequency-dividing means for varying the step-down ratio thereof.

* * * * *